Aug. 19, 1969 W. F. ALLINGHAM ET AL 3,461,912

NON-DISPLACEABLE ROTARY VALVE

Filed Feb. 24, 1964

INVENTORS
WALTER F. ALLINGHAM,
BY HUGH M. MORGAN

Alan M. Staubly
ATTORNEY

United States Patent Office 3,461,912
Patented Aug. 19, 1969

3,461,912
NON-DISPLACEABLE ROTARY VALVE
Walter F. Ailingham, Torrance, and Hugh M. Morgan, Culver City, Calif., assignors to Honeywell Inc., a corporation of Delaware
Filed Feb. 24, 1964, Ser. No. 346,809
Int. Cl. F16k 5/02, 35/02, 31/44
U.S. Cl. 137—636.4
7 Claims This invention relates to a manifold valve of a type having a plurality of control valves including a rotary plug valve, a thermocouple controlled safety valve and a resetting mechanism for rotating the plug valve and resetting the safety valve. More particularly, the invention relates to an interlock type of safety resetting mechanism for a valve of the above-mentioned type wherein a single abutment member functions to control the indexing of the plug valve, to provide for the retaining of the resetting means in assembled relationship with respect to these valves and to prevent lifting of the plug valve off of its seat.

Valves of the above-mentioned type are generally well known in the art but all have much more complicated and more expensive mechanisms for providing the indexing and safety resetting functions of the plug and safety valves.

One of the objects of this invention is to provide a valve of the above-mentioned type wherein simple and inexpensive means is provided for the indexing of the plug valve, resetting of the safety valve, and the holding of the elements of the valve in assembled relationship.

Another object of the present invention is to provide a safety resetting mechanism wherein an abutment member, in the general form of a washer, has portions thereof shaped to provide abutment means for indexing or regulating the angular positions of the plug valve and for retaining the adjusting knob for the plug valve in assembled relationship with respect to the plug valve, in cooperation with a single abutment member mounted on the valve body.

Still another object of the invention is to provide an interlocking type of safety reset mechanism for a plug and safety valve wherein a single generally washer-shaped abutment member is secured to an actuating and resetting knob for the plug valve and safety valve, for cooperation with a single abutment member mounted on the valve body, to provide indexing means for the plug valve and to prevent unseating of the plug valve from its seat.

Still further objects of the invention will become apparent upon reading the following detailed description of the invention in conjunction with the drawing, wherein.

Figure 1:
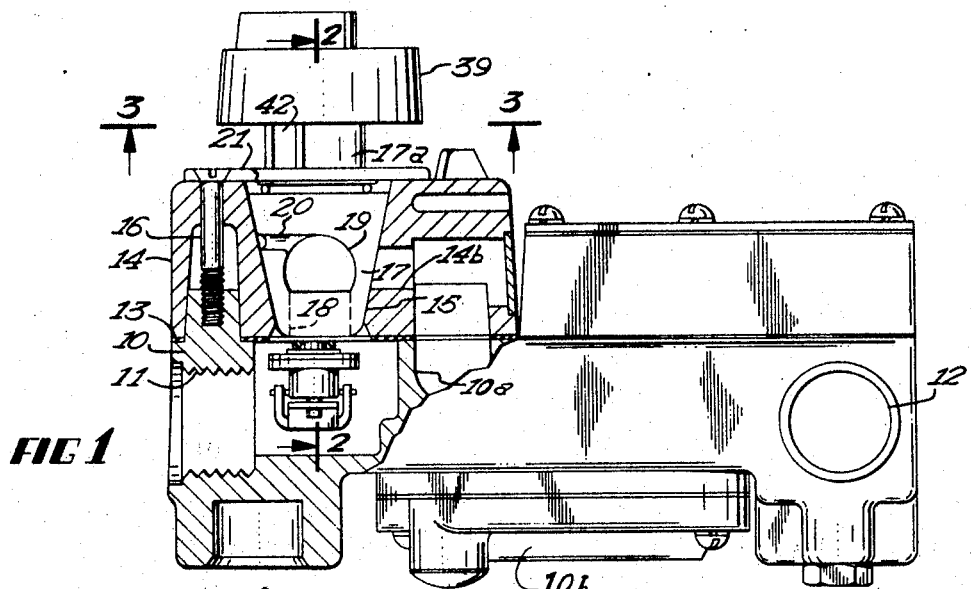
FIGURE 1 is an elevational view of the manifold valve, with portions thereof broken away.
Figure 2:
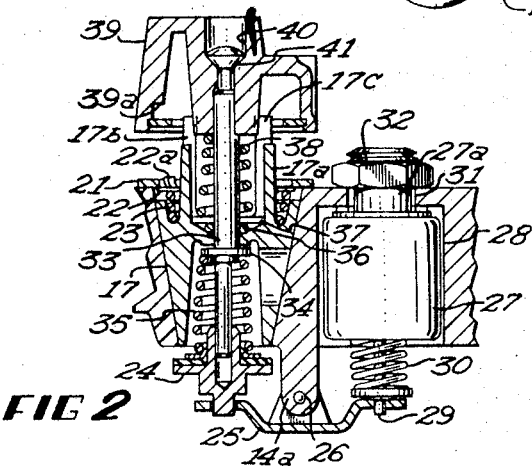
FIGURE 2 is a fragmentary cross-sectional view taken along line 2—2 of FIGURE 1.

Referring to FIGURE 1 of the drawing, the reference numeral 10 generally designates the main body portion of the manifold valve, with a threaded inlet opening 11 and a similar outlet opening 12. Mounted on the body portion 10, with an insulating gasket 13 therebetween, is a second valve body portion 14 having a conical bore or cavity 15 therein extending from the top surface thereof to the bottom thereof. Portion 14 is secured to the portion 10 by means of bolts 16, one of which is shown in the drawing.

A plug valve 17, having an inlet 18 on the bottom thereof, a main burner gas outlet 19 extending through a side thereof and a pilot burner gas passageway 20 communicating with the outlet 19 and extending partially around the periphery of the plug valve to a pilot gas burner outlet (not shown) is positioned in the conical bore 15. A plate 21 extends across the upper end of the cavity 15 and is secured to the body portion 14 by means of the bolts 16. The plug valve has a sleeve-like extension 17a projecting from the upper end thereof and through the plate 21 and is slotted across its upper end and internally to provide oppositely disposed grooves for the reception of complementary shaped rib portions of an actuating knob to be presently described. A washer-shaped abutment member 22 surrounds the extension 17a and is spring biased against the surface of the plate 21 by one end of a coil compression spring 23, said spring bearing at its other end against the top of the plug valve 17. It is thus seen that the coil compression spring besides holding the stop washer against the plate 21 also holds the plug valve in its conical valve cavity to provide a gas tight seal therebetween.

A safety valve 24 is supported on one end of lever 25, which is mounted on a pivot 26 extending through a downwardly extending portion 14a of the valve body portion 14. A conventional thermocouple energizable electromagnet unit 27 is mounted in a cavity 28 in the body portion 14 and has an armature stem 29 engaging in an aperture in the other end of the lever 25, with a coiled compression spring 30 extending between the magnet unit and that end of the lever to normally bias the valve 24 against the lower end of the plug valve as a valve seat. The magnet unit is held in the socket 28 by an extension 27a positioned in an aperture 31 and clamped therein by a nut 32. The extension 27a is one adapted to receive a conventional concentric lead type of connector for a conventional concentric lead type of thermocouple. The valve 24 has an axial bore therein which receives the lower end of a reset stem 33 extending through an axial bore in the upper end of the plug valve and outwardly through and above the plug valve extension 17a. This reset stem serves as a guide for the valve 24 as well as the means for manually lowering the valve to its open position and forcing the armature (not shown) of the magnet into engaging with the pole of the magnet (not shown).

An annular shoulder 34 on the stem 33 is normally spaced a slight distance from the adjacent inner surface of the plug valve and provides an abutment for one end of a coil compression spring 35, the other end of which bears against the valve 24 to bias the valve 24 towards its open position. The spring 35 is weaker than the spring 30 so that when the magnet unit 27 is de-energized, the spring 30 can overpower the spring 35 to close the valve. An O-ring 36 surrounds the reset stem 33 at the upper surface of the valve body and at the lower end of the extension 17a and is clamped sealingly against the reset stem by means of a washer 37 and a coil compression spring 38 bearing against the washer, the spring bearing at its upper end against a manually operable knob 39.

Figure 3:
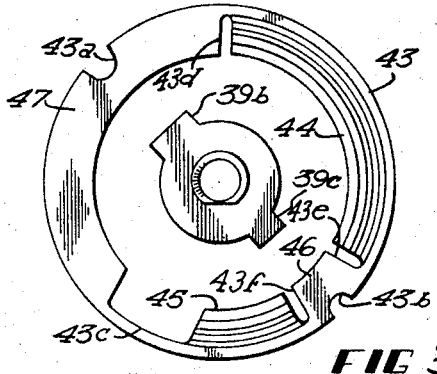
FIGURE 3 is an enlarged view of the washer-shaped abutment member and the inner end of the knob for rotating the plug valve.
Figure 4:
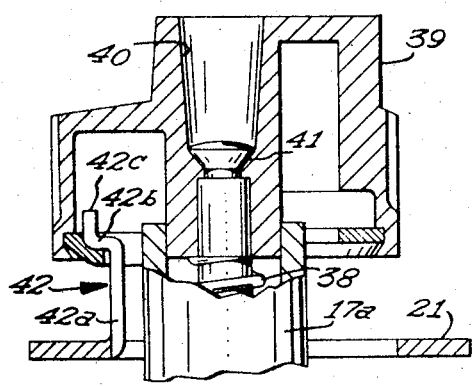
FIGURE 4 is an enlarged fragmentary view of the plug valve and knob with portions thereof broken away; and, FIGURE 5 is an enlarged fragmentary view of the valve and knob showing the knob in a different angular position with respect to its showing in FIGURE 4.
Figure 5:
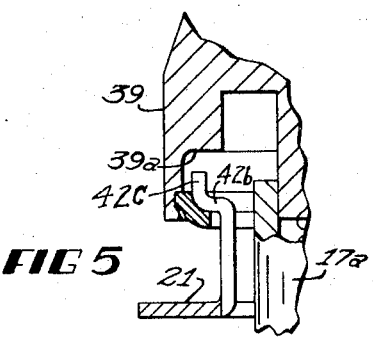

The knob 39 has an axial bore 40 therein, with a nonround lower extension thereof engaging a non-round portion of the upper end of the reset stem. The knob is held on the reset stem by means of a bolt 41 screw threaded into the reset stem. As can best be seen in FIGURE 3 of the drawing, the knob 39 has ribs 39b and 39c which engage the slots and grooves 17b and 17c of the plug valve extension 17a to provide a splined connection between the plug valve and the knob. The knob also has an arcuate abutment shoulder 39a, which is adapted to cooperate with the upper end 42c of an abutment member 42 on the plate 21, to prevent axial movement of the knob with respect to the plug valve when the plug valve is in its "on" position, with the opening 19 registering with a passageway 14b in the body portion 14. The passageway 14b connects with a passage 10a leading to the outlet 12 through a pressure regulator valve 10b. The arcuate shoulder 39a is of such length that in the "pilot" position of the plug valve, as shown in FIGURE 4, the knob 39 is axially movable a distance sufficient to open the valve 24 and reset the armature within the magnet unit 27.

Mounted in the lower end of the knob 39 is a washer-shaped member 43 that is shaped to provide arcuate abutment means. It has different sized notches 43a and 43b in its outer periphery which engage comparably shaped bosses (not shown) on the inner periphery of a skirt portion of the knob to properly orient the washer-shaped member therein. It is retained in the lower end of the knob, against an annular shoulder, by staking over or rolling over the lower edge of the knob to fixedly clamp it therein. The member 43 has a large notched out portion 43c which serves no useful assembled purpose but enables the assembly of the knob over the abutment member 42 on the plate 21 and onto the plug valve. The member also has spaced notches 43d, 43e and 43f to provide for the transversely offsetting of two arcuate portions 44 and 45, leaving arcuate abutment portions 46 and 47 therebetween and in the same plane as the outer periphery of the washer-shaped member. In the assembled relationship of the knob and the plug valve, the arcuate portion 46 engages a transversely extending portion 42b of the fixed abutment member 42 at the notch 43f, when the plug valve is in its "off" position. The other end of the arcuate portion 46 at the notch 43e serves as an abutment engaging the portion 42b at the "pilot" position of the plug valve. This means that to rotate the plug valve to and from the "off" position thereof, it is necessary to depress the knob 39 a slight amount to position the portion 42b above the plane of the top surface of the member 43 so that the portion 46 may be rotated past and under the portion 42b. The arcuate portion 47 at the notch 43d serves as an abutment for engagement with the portion 42b when the plug valve is in its "on" position. This means that the plug valve can be rotated freely, with the portion 42b sliding on the laterally offset portion 44, between the "pilot" and "on" positions. Should the plug valve be provided with an additional position wherein it is necessary to rotate the portion 47 below the abutment portion 42b, it is again necessary to depress the knob slightly to place the portion 47 under the portion 42b so that it can move thereunder to a further rotated position.

In none of the angular positions that the plug valve normally assumes in the use of the manifold valve, does the notch 43c register with the abutment member 42a. This means that each of the arcuate portions 44–47 will serve the function of preventing sufficient axial movement of the knob 39 outwardly from plug valve 17 or the valve body 14 as to enable the lifting of the knob 39 so as to engage shoulder 34 with the plug valve or to unseat the plug valve and thus cause an unsafe escape of gas around the plug valve. Also, in the event the resetting stem has no annular abutment shoulder, which would mean that no matter how far the reset stem moves outwardly from the plug valve, the arcuate member on the washer-shaped member would prevent the knob and reset stem from becoming disassembled from the plug valve. Therefore, regardless of the reset stem construction, the washer-shaped abutment member 43 serves the dual function of providing an indexing means for a rotary or plug valve and a retaining means for the actuating and resetting means for the plug valve and the safety valve, as well as a prevention of an undesirable unseating of the plug valve.

If desired, abutment arm 22a may be provided on the washer 22 and the washer 22 splined to the extension 17a so that the arm 22a may strike the abutment member 42a at one end of the plug valve movement and strike another portion of the member 42 or abutment means (not shown) located elsewhere at the other end of the rotary movement of the plug valve, leaving the previously mentioned abutment shoulders provided by the arcuate portions to control the intermediate positions of the plug valve.

OPERATION

To place the valve in operation, from its "off" position, it is necessary to depress the knob to lower the abutment washer 43 sufficiently to clear the fixed abutment portion 42b and then rotate the knob to the "pilot" position. In this position, the manual knob 39 may be depressed a sufficient distance to open the valve 34 and reset the electromagnet armature against its cooperating magnet. This positions the pilot gas passageway in registration with the inlet and the pilot burner outlet so that gas will flow to the pilot burner for ignition. Upon the pilot flame being established and heating a thermocouple (not shown) connected to the electromagnet, releasing of the knob 39 will position the abutment means 42b against the arcuate portion 44 so that the knob may then be rotated to move the abutment 46 away from the abutment 42b and place the abutment 47 against the abutment 42b at the "on" position of the plug valve. This will establish full gas flow to the main burner without any danger of the plug valve being rotated to a "partially off" position or "full off" position accidentally. If it should be desired to place the heating apparatus in a summer shutdown condition with the pilot flame still on, the plug valve may be freely rotated from the "on" position to the "pilot" position where it will again be stopped without danger of accidentally going to the "off" position. It is thus seen that the simple and inexpensive construction of the washer-shaped abutment member, provided in the invention of this application, provides a structure that performs a plurality of functions in a new and novel manner.

We claim:

1. A control valve comprising a valve body having a main fluid flow passageway therethrough, a rotary valve in said passageway, a spring between said valve body and said rotary valve to hold it in sealing engagement in said passageway, a safety valve also in said passageway and adapted to arrest flow through same, an actuating means for rotating said rotary valve between "off," "pilot" and "on" positions and having abutment means thereon engaging the rotary valve to prevent outward movement thereof with respect to said rotary valve but axially slidable inwardly in said rotary valve for moving said safety valve to its open position in the "pilot" position of the rotary valve, a first abutment means on said valve body adjacent said actuating means, second abutment means on said actuating means for cooperation with said first abutment means to prevent sufficient inward axial movement of said actuating means to open said safety valve when said rotary valve is in its "on" position, and third abutment on said actuating means cooperable with said first abutment means to provide position stops for the rotary valve and to prevent outward movement of said rotary valve with respect to said valve body by said actuating means in all of its adjustable rotary positions.

2. A control valve as defined in claim 1 wherein said first abutment means has a transversely extending arm that projects between said second and third abutment means.

3. A control valve as defined in claim 2 wherein said third abutment means is in the form of a washer shaped to provide said position stops and secured to the periphery of said actuating means.

4. In a valve including a valve body having an inlet and an outlet with an apertured partition therebetween and a rotary valve adjustable between "off," "pilot" and "on" positions and biased into seating engagement with said apertured partition to control fluid flow through said valve body and a safety valve positioned to control fluid flow through said rotary valve, the combination comprising actuating means operably connected to said rotary valve for rotating said valve, said actuating means having abutment means thereon engaging the rotary valve to prevent outward movement thereof with respect to said rotary valve but axially slidable inwardly relative to said rotary valve to actuate said safety valve, arcuate abutment means rotatable with said actuating means, and fixed abutment means on said valve body with a transversely extending portion thereof cooperable with said arcuate abutment means to limit axial movements of said actuating means with respect to said valve body in all of its adjustable positions, said arcuate abutment means having an axially offset portion leaving an abutment shoulder on said arcuate abutment means that cooperates with said fixed abutment means to prevent rotation of said abutment shoulder past said fixed abutment means in one of said positions except when said actuating means is axially displaced inwardly to place said abutment shoulder out of the plane of said transversely extending portion and said axially offset portion cooperating with said fixed abutment means to prevent said actuating means from being moved axially sufficiently far as to move said rotary valve axially with respect to said valve body.

5. The combination defined in claim 4 wherein said arcuate abutment means is in the form of a washer secured to said actuating means.

6. A valve having an "off" and at least a full "on" position comprising a valve body having an inlet passage and at least one outlet passage and with a chamber therebetween, a tapered rotatable plug member seated in said chamber including at least one plug inlet passage and one plug outlet passage arranged to register with said inlet and outlet passages upon rotation from an "off" to an "on" position to allow fluid flow through said valve body, an "on-off" safety member operably mounted in said valve body in said body inlet passage to control fluid flow through said rotatable plug member, a rotatable knob having an operable connection with said plug member and said safety member, said knob being so mounted on said rotatable plug as to be axially depressable but non-rotatable relative to said plug for moving the safety control to its "on" position, abutment means between said connection and said plug member that prevents outward movement of said knob with respect to said plug member, a first rotatable stop member mounted on and rotatable with said knob and being generally circular in shape with at least one peripheral portion thereof being axially displaced to leave at least one pair of stops in the plane of said first stop member, and a second stop member having upper and lower portions, said lower portion being connected to said valve body, said upper portion being arranged to overlie and ride on said first rotatable stop member thus preventing axial displacement of said plug member outwardly with respect to said valve body and also positioned in the plane of said pair of stops as to prevent rotation of said plug member past said stop without axial depression of said knob.

7. In a valve having a valve housing, a rotary valve positioned in said housing, means biasing said rotary valve into seating engagement with the valve housing, valve actuating means having a non-rotatable connection with said rotary valve and having limited axially inward slidable movements relative to said rotary valve, means between said connection and valve preventing outward movement of said actuating means from said rotary valve, position control means for said valve, means for affixing said position control means to said valve actuating means, and an abutment member affixed to said valve housing and extending outwardly therefrom toward said actuating means, said abutment member having a portion thereof extending substantially parallel to the plane of said position control means and overlapping a portion thereof; said position control means comprising a washer-shaped disc having at least one substantially circular edge and a plurality of adjacent arcuate abutment portions, at least one of said arcuate abutment portions being axially offset from an adjacent one to leave an abutment shoulder at the end of said adjacent one, said arcuate portions being positioned between said abutment member portion and said valve housing in each of the rotary positions of the valve thereby restricting the movement of said disc outwardly from said valve body to prevent the unseating of said rotary valve, and means yieldingly biasing said axially offset arcuate portion of said disc into contact with said abutment member portion so as to permit the rotation of said disc to other positions only when said disc is depressed.

References Cited

UNITED STATES PATENTS

| 2,834,367 | 5/1958 | Mihm | 137—66 |
| 2,746,472 | 5/1956 | Sogge | 137—66 |
| 3,150,712 | 9/1964 | Baatrup | 137—65 X |
| 3,236,252 | 2/1966 | Allingham | 137—66 |

FOREIGN PATENTS

| 641,869 | 5/1962 | Canada. |
| 31,308 | 11/1933 | Netherlands. |
| 771,524 | 4/1957 | Great Britain. |

WILLIAM F. O'DEA, Primary Examiner

RICHARD GERARD, Assistant Examiner

U.S. Cl. X.R.

137—66; 251—96